(12) United States Patent
Lee et al.

(10) Patent No.: US 9,133,912 B2
(45) Date of Patent: *Sep. 15, 2015

(54) PLANETARY GEAR TRAIN OF AUTOMATIC TRANSMISSION FOR VEHICLE

(71) Applicant: Hyundai Motor Company, Seoul (KR)

(72) Inventors: Chang Wook Lee, Suwon-si (KR); Kangsoo Seo, Yongin-si (KR); Jae Chang Kook, Hwaseong-si (KR); Jongsool Park, Hwaseong-si (KR); Myonghoon Noh, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,336

(22) Filed: Dec. 2, 2013

(65) Prior Publication Data

US 2014/0162831 A1 Jun. 12, 2014

(30) Foreign Application Priority Data

Dec. 10, 2012 (KR) ........................ 10-2012-0143084

(51) Int. Cl.
*F16H 3/44* (2006.01)
*F16H 3/46* (2006.01)
*F16H 3/66* (2006.01)

(52) U.S. Cl.
CPC .. *F16H 3/46* (2013.01); *F16H 3/66* (2013.01); *F16H 3/666* (2013.01); *F16H 2200/0065* (2013.01); *F16H 2200/2007* (2013.01); *F16H 2200/2046* (2013.01)

(58) Field of Classification Search
CPC .............. F16H 3/46; F16H 2200/0065; F16H 2200/2007; F16H 2200/2046
USPC ........................... 475/269, 284, 302, 330, 343
See application file for complete search history.

(56) References Cited

U.S. PATENT DOCUMENTS 7,637,839 B2 * 12/2009 Hiraiwa ........................ 475/284
2005/0032603 A1 * 2/2005 Bulgrien ...................... 475/302

FOREIGN PATENT DOCUMENTS

| JP | 2005-023987 A | 1/2005 |
| KR | 10-0183075 B1 | 4/1999 |
| KR | 10-1172304 B1 | 8/2012 |

OTHER PUBLICATIONS

KR1996-0017245 (machine translation)—Park et al. (Jan. 11, 1996).*
KR101172304B1 (machine translation)—Lee et. al. (Mar. 5, 2012).*
JP2005023987A (machine translation)—Hiraiwa et al. (Jan. 27, 2005).*

* cited by examiner

*Primary Examiner* — Justin Holmes
*Assistant Examiner* — Tinh Dang
(74) *Attorney, Agent, or Firm* — McDermott Will & Emery LLP

(57) ABSTRACT

A planetary gear train may include a first shaft receiving torque from an engine, a second shaft disposed in parallel with the first shaft, a first planetary gear set disposed on the first shaft including a first rotation element, a second rotation element and a third rotation element operated as an output element, and a second planetary gear set disposed on the second shaft including a fourth rotation element, a fifth rotation element, and a sixth rotation element. A planetary gear train may further include four transfer gears connecting rotation elements of the second planetary gear set with the first shaft and rotation elements of the first planetary gear set, and frictional elements connecting rotation elements with each other or with the first shaft and brakes connecting with the transmission housing.

18 Claims, 9 Drawing Sheets

FIG.2

|  | C1 | C2 | C3 | C4 | B1 | B2 | Gear ratio |
|---|---|---|---|---|---|---|---|
| 1ST | ● |  |  |  | ● |  | 4.726 |
| 2ND | ● |  |  |  |  | ● | 2.855 |
| 3RD | ● | ● |  |  |  |  | 1.899 |
| 4TH | ● |  | ● |  |  |  | 1.400 |
| 5TH |  | ● | ● |  |  |  | 1.000 |
| 6TH |  |  | ● |  |  | ● | 0.788 |
| 7TH |  |  | ● | ● |  |  | 0.628 |
| 8TH |  |  |  | ● |  | ● | 0.555 |
| 9TH |  | ● |  | ● |  |  | 0.505 |
| R |  | ● |  |  | ● |  | −3.707 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2012-0143084 filed in the Korean Intellectual Property Office on Dec. 10, 2012, the entire contents of which are incorporated herein by reference.

TECHNICAL FIELD

The present disclosure relates to an automatic transmission for a vehicle. More particularly, the present disclosure relates to a planetary gear train of an automatic transmission for a vehicle that can improve mountability and power delivery performance and reduce fuel consumption.

BACKGROUND

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight, and power delivery efficiency may be deteriorated.

Particularly, since the planetary gear train having a number of components is hard to be mounted in a front wheel drive vehicle, research for minimizing the number of components has been developed.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a planetary gear train of an automatic transmission for a vehicle having advantages of improving mountability by shortening a length thereof and reducing the number of components as a consequence of achieving nine forward speeds and one reverse speed by disposing two planetary gear sets separately on a first shaft and a second shaft disposed in parallel and connecting rotation elements of the planetary gear sets through a plurality of externally-meshed gears.

In addition, the present disclosure has been made in an effort to provide a planetary gear train of an automatic transmission for a vehicle having further advantages of setting optimum gear ratios by ease of changing gear ratios by using a plurality of externally-meshed gears, and accordingly improving power delivery performance and fuel economy.

A planetary gear train of an automatic transmission for a vehicle may include: a first shaft receiving torque from an engine; a second shaft disposed in parallel with the first shaft with a predetermined distance; a first planetary gear set disposed on the first shaft, and including a first rotation element selectively connected to the first shaft, a second rotation element selectively connected to the first shaft or a transmission housing, and a third rotation element operated as an output element; a second planetary gear set disposed on the second shaft, and including a fourth rotation element connected to the first rotation element through a gear and selectively connected to the transmission housing, a fifth rotation element selectively connected to the first shaft through two paths respectively including an externally-meshed gear, and a sixth rotation element connected to the third rotation element through an externally-meshed gear and directly connected to an output gear; four transfer gears connecting rotation elements of the second planetary gear set with the first shaft and the rotation elements of the first planetary gear set; and frictional elements including clutches selectively connecting selected rotation elements with each other or with the first shaft and brakes selectively connecting selected rotation elements with the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The four transfer gears may include: a first transfer gear connecting the first shaft with the fifth rotation element; a second transfer gear connecting the third rotation element with the sixth rotation element; a third transfer gear including an idler gear and connecting the first rotation element with the fourth rotation element; and a fourth transfer gear connecting the first shaft with the fifth rotation element.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

The first clutch and the first brake may be operated at a first forward speed, the first clutch and the second brake may be operated at a second forward speed, the first clutch and the second clutch may be operated at a third forward speed, the first clutch and the third clutch may be operated at a fourth forward speed, the second clutch and the third clutch may be operated at a fifth forward speed, the third clutch and the second brake may be operated at a sixth forward speed, the third clutch and the fourth clutch may be operated at a seventh forward speed, the fourth clutch and the second brake may be operated at an eighth forward speed, the second clutch and the fourth clutch may be operated at a ninth forward speed, and the second clutch and the first brake may be operated at a reverse speed.

In another exemplary embodiment, the frictional elements may include: a first clutch disposed between the first transfer gear and the fifth rotation element; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

In another exemplary embodiment, the frictional elements may include: a first clutch disposed between the first shaft and the first transfer gear; a second clutch disposed between the third transfer gear and the fourth rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

In still another exemplary embodiment, the frictional elements may include: a first clutch disposed between the first shaft and the first transfer gear; a second clutch disposed between the first shaft and the first rotation element; a third clutch disposed between the first shaft and the second rotation element; a fourth clutch disposed between the first shaft and the fourth transfer gear; a first brake disposed between the second rotation element and the transmission housing; and a second brake disposed between the fourth rotation element and the transmission housing.

In yet another exemplary embodiment, the frictional elements may include: a first clutch disposed between the first shaft and the first transfer gear; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the first rotation element and the transmission housing.

In another exemplary embodiment, the first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be further a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

A planetary gear train of an automatic transmission for a vehicle according to another aspect of the present invention may include: a first shaft receiving torque from an engine; a second shaft disposed in parallel with the first shaft with a predetermined distance; a first planetary gear set disposed on the first shaft, and including a first rotation element selectively connected to the first shaft, a second rotation element selectively connected to the first shaft or a transmission housing, and a third rotation element; a second planetary gear set disposed on the second shaft, and including a fourth rotation element connected to the first rotation element and selectively connected to the transmission housing, a fifth rotation element selectively connected to the first shaft through two paths, and a sixth rotation element connected to the third rotation element and directly connected to an output gear; a first transfer gear connecting the first shaft with the fifth rotation element; a second transfer gear connecting the third rotation element with the sixth rotation element; a third transfer gear including an idler gear and connecting the first rotation element with the fourth rotation element; a fourth transfer gear connecting the first shaft with the fifth rotation element; and frictional elements including clutches selectively connecting selected rotation elements with each other or with the first shaft and brakes selectively connecting selected rotation elements with the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

In another exemplary embodiment, the frictional elements may further include: a first clutch disposed between the first transfer gear and the fifth rotation element; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

In yet another exemplary embodiment, the frictional elements may include: a first clutch disposed between the first shaft and the first transfer gear; a second clutch disposed between the third transfer gear and the fourth rotation element; a third clutch disposed between the first shaft and the second rotation element; a fourth clutch disposed between the fourth transfer gear and the fifth rotation element; a first brake disposed between the second rotation element and the transmission housing; and a second brake disposed between the fourth rotation element and the transmission housing.

In still another exemplary embodiment, the frictional elements may include: a first clutch disposed between the first shaft and the first transfer gear; a second clutch disposed between the first shaft and the first rotation element; a third clutch disposed between the first shaft and the second rotation element; a fourth clutch disposed between the first shaft and the fourth transfer gear; a first brake disposed between the second rotation element and the transmission housing; and a second brake disposed between the fourth rotation element and the transmission housing.

In another exemplary embodiment, the frictional elements may even further include: a first clutch disposed between the first shaft and the first transfer gear; a second clutch disposed between the first shaft and the first rotation element; a third clutch disposed between the first shaft and the second rotation element; a fourth clutch disposed between the fourth transfer gear and the fifth rotation element; a first brake disposed between the second rotation element and the transmission housing; and a second brake disposed between the first rotation element and the transmission housing.

In another exemplary embodiment, the first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

In another exemplary embodiment, the first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

BRIEF DESCRIPTION OF THE DRAWINGS

FIG. 2 is an operational chart of friction elements at each shift-speed applied to a planetary gear train according to the first exemplary embodiment of the present disclosure.

DETAILED DESCRIPTION OF THE EMBODIMENTS

Figure 1:
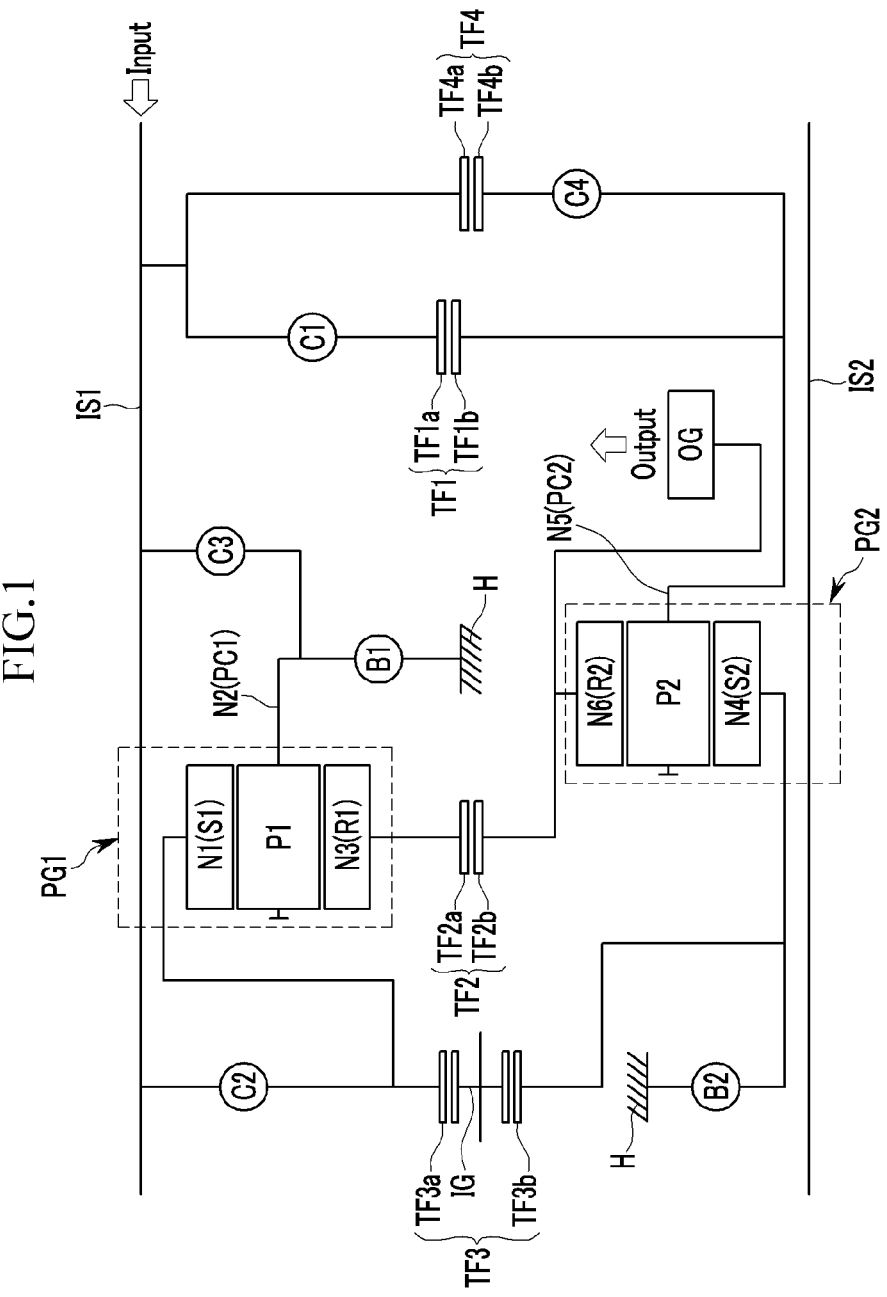
FIG. 1 is a schematic diagram of a planetary gear train according to the first exemplary embodiment of the present disclosure.

Exemplary embodiments of the present disclosure will hereinafter be described in detail with reference to the accompanying drawings. Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a planetary gear train according to the first exemplary embodiment of the present disclosure.

Referring to FIG. 1, a planetary gear train according to the first exemplary embodiment of the present invention includes a first planetary gear set PG1 disposed on a first shaft IS1, a second planetary gear set PG2 disposed on a second shaft IS2 disposed in parallel with the first shaft IS1, four transfer gears TF1, TF2, TF3, and TF4, and frictional elements consisting of four clutches C1, C2, C3, and C4 and two brakes B1 and B2.

Therefore, torque input from the first shaft IS1 is converted into nine forward speeds and one reverse speed by a cooperation of the first and second planetary gear sets PG1 and PG2, and is output through an output gear OG.

The first shaft IS1 is an input member, and torque from a crankshaft of the engine is changed through a torque converter and is input to the first shaft IS1.

The second shaft IS2 supports the second planetary gear set PG2 without rotational interference therebetween.

The first planetary gear set PG1 is a single pinion planetary gear set and includes a first sun gear S1 being a first rotation element N1, a first planet carrier PC1 rotatably supporting a first pinion P1 externally meshed with the first sun gear S1 and being a second rotation element N2, and a first ring gear R1 internally meshed with the first pinion P1 and being a third rotation element N3.

The second planetary gear set PG2 is a single pinion planetary gear set, and includes a second sun gear S2 being a fourth rotation element N4, a second planet carrier PC2 rotatably supporting a second pinion P2 externally meshed with the second sun gear S2 and being a fifth rotation element N5, and a second ring gear R2 internally meshed with the second pinion P2 and being a sixth rotation element N6.

The first and second rotation elements N1 and N2 of the first planetary gear set PG1 are selectively connected to the first shaft IS1, the fourth rotation element N4 of the second planetary gear set PG1 is connected to the first rotation element N1 through an externally-meshed gear, the fifth rotation element N5 is selectively connected to the first shaft IS1 through two path respectively having an externally-meshed gear, and the sixth rotation element N6 is connected to the third rotation element N3 through an externally-meshed gear and is directly connected to the output gear OG.

The output gear OG drives a drive shaft including a driving wheel through a final reduction gear (not shown) and a differential apparatus (not shown).

The first, second, third, and fourth transfer gears TF1, TF2, TF3, and TF4 respectively have first, second, third, and fourth transfer drive gears TF1a, TF2a, TF3a, and TF4a. The first, second, third, and fourth transfer driven gears TF1b, TF2b, TF3b, and TF4b are externally meshed with each other.

The third transfer gear TF3 further includes an idler gear IG interposed between the third transfer drive gear TF3a and the third transfer driven gear TF3b.

Therefore, the first rotation element N1 and the fourth rotation element N4 rotate to the same direction.

The first transfer gear TF1 connects the first shaft N1 with the fifth rotation element N5.

The second transfer gear TF2 connects the third rotation element N3 with the sixth rotation element N6.

The third transfer gear TF3 includes the idler gear IG and connects the first rotation element N1 with the fourth rotation element N4.

The fourth transfer gear TF4 connects the first shaft IS1 with the fifth rotation element N5.

Therefore, the rotation elements (including the first shaft IS1) connected with each other through the first, second, third, and fourth transfer gears TF1, TF2, TF3, and TF4 are rotated in opposite direction to each other or in the same direction according to gear ratios of the first, second, third, and fourth transfer gears TF1, TF2, TF3, and TF4.

In addition, four clutches C1, C2, C3, and C4 selectively connecting the selected rotation elements (including the first shaft IS1) and two brakes B1 and B2 selectively connecting the selected rotation elements to the transmission housing H are disposed as follows.

The first clutch C1 is disposed between the first shaft IS1 and the first transfer gear TF1.

The second clutch C2 is disposed between the first shaft IS1 and the first rotation element N1.

The third clutch C3 is disposed between the first shaft IS1 and the second rotation element N2.

The fourth clutch C4 is disposed between the fourth transfer gear TF4 and the fifth rotation element N5.

The first brake B1 is disposed between the second rotation element N1 and the transmission housing H.

The second brake B2 is disposed between the fourth rotation element N4 and the transmission housing H.

The frictional elements consisting of the first, second, third, and fourth clutches C1, C2, C3, and C4 and the first and second brakes B1 and B2 are conventional multi-plate friction elements of wet type operated by hydraulic pressure.

FIG. 2 is an operational chart of friction elements at each shift-speed applied to a planetary gear train according to the first exemplary embodiment of the present disclosure.

As shown in FIG. 2, two frictional elements are operated at each shift-speed in the planetary gear train according to the exemplary embodiment of the present disclosure.

The first clutch C1 and the first brake B1 are operated at a first forward speed $1^{ST}$.

The first clutch C1 and the second brake B2 are operated at a second forward speed $2^{ND}$.

The first clutch C1 and the second clutch C2 are operated at a third forward speed $3^{RD}$.

The first clutch C1 and the third clutch C3 are operated at a fourth forward speed $4^{TH}$.

The second clutch C2 and the third clutch C3 are operated at a fifth forward speed $5^{TH}$.

The third clutch C3 and the second brake B2 are operated at a sixth forward speed $6^{TH}$.

The third clutch C3 and the fourth clutch C4 are operated at a seventh forward speed $7^{TH}$.

The fourth clutch C4 and the second brake B2 are operated at an eighth forward speed $8^{TH}$.

The second clutch C2 and the fourth clutch C4 are operated at a ninth forward speed $9^{TH}$.

The second clutch C2 and the first brake B1 are operated at a reverse speed R.

Figure 3:
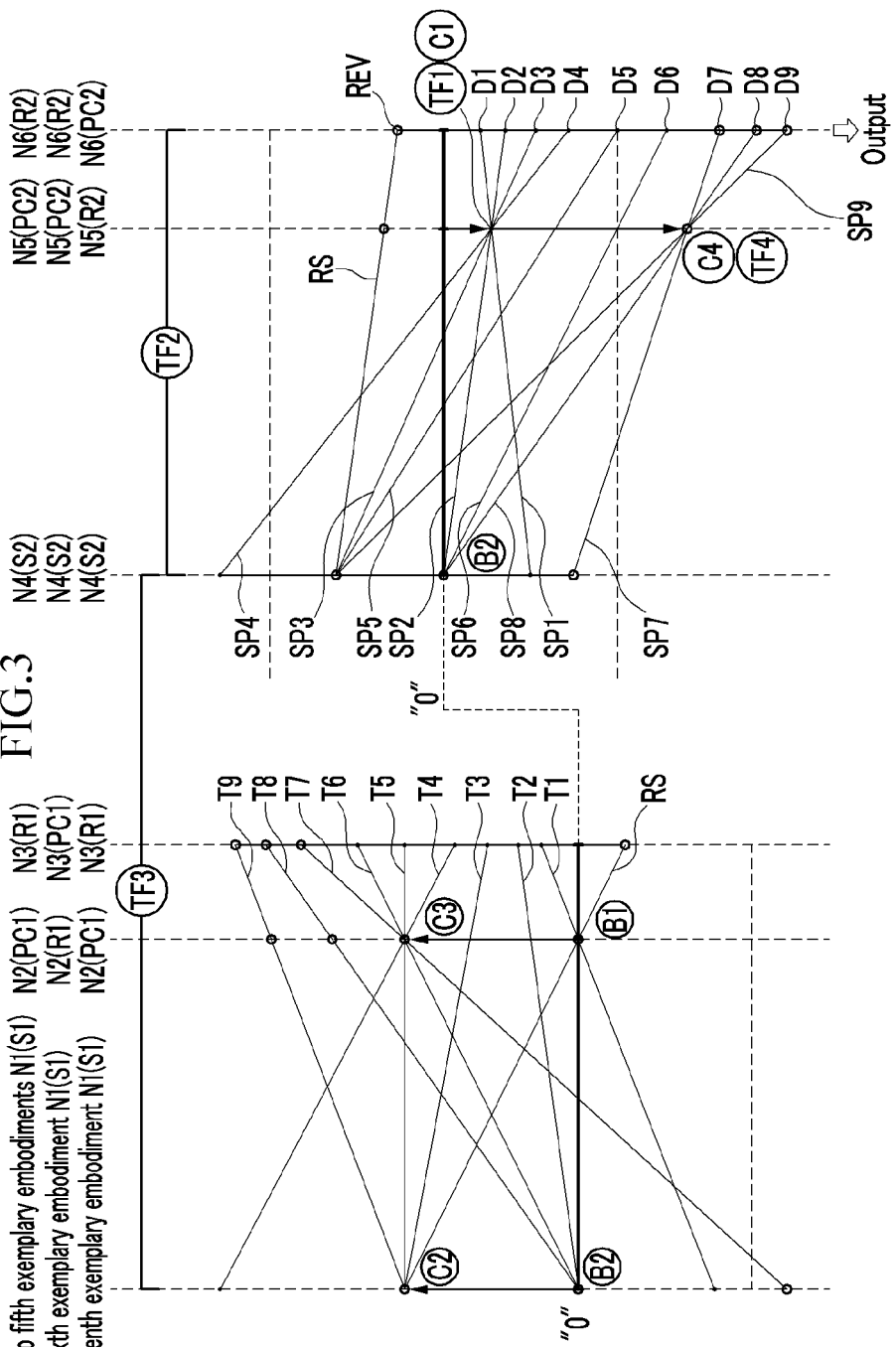
FIG. 3 is a lever diagram of a planetary gear train according to the first exemplary embodiment of the present disclosure.

FIG. 3 is a lever diagram of a planetary gear train according to the first exemplary embodiment of the present disclosure, and illustrates shift processes of the planetary gear train according to the first exemplary embodiment of the present disclosure by lever analysis.

Referring to FIG. 3, three vertical lines of the first planetary gear set PG1 are set as the first, second, and third rotation elements N1, N2, and N3 from the left to the right, and three vertical lines of the second planetary gear set PG2 are set as the fourth, fifth, and sixth rotation elements N4, N5, and N6 from the left to the right.

A middle horizontal line represents a rotation speed of "0", upper horizontal lines represent positive rotation speeds and lower horizontal lines represent negative rotation speeds.

In addition, "−" in FIG. 3 means that rotational elements are rotated in an opposite direction to the rotation direction of the engine since the first shaft IS1 and the first and second planetary gear sets PG1 and PG2 are externally meshed through the first, second, and fourth transfer gears TF1, TF2, and TF4 without an idler gear. Since the third transfer gear TF3 includes the idler gear IG, the rotation elements connected through the third transfer gear TF3 rotate to the same direction.

In addition, distances between the vertical lines of the first and second planetary gear sets PG1 and PG2 are set according to gear ratios (teeth number of a sun gear/teeth number of a ring gear).

Hereinafter, referring to FIG. 2 and FIG. 3, the shift processes of the planetary gear train will be described in detail.

[First Forward Speed]

Referring to FIG. 2, the first clutch C1 and the first brake B1 are operated at the first forward speed $1^{ST}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the first transfer gear TF1 and is then input to the fifth rotation element N5 as an inverse rotation speed by operation of the first clutch C1, and the second rotation element N2 is operated as a fixed element by operation of the first brake B1.

Therefore, the rotation elements of the first planetary gear set PG1 form a first speed line T1 and the rotation elements of the second planetary gear set PG2 form a first shift line SP1 by cooperation of the first planetary gear set PG1 and the second planetary gear set PG2. Therefore, D1 is output through the sixth rotation element N6 that is the output element.

[Second Forward Speed]

The first brake B1 that was operated at the first forward speed $1^{ST}$ is released and the second brake B2 is operated at the second forward speed $2^{ND}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the first transfer gear TF1 and is then input to the fifth rotation element N5 as an inverse rotation speed by operation of the first clutch C1, and the fourth rotation element N4 is operated as a fixed element by operation of the second brake B2.

Therefore, the rotation elements of the first planetary gear set PG1 form a second speed line T2 and the rotation elements of the second planetary gear set PG2 form a second shift line SP2 by cooperation of the first planetary gear set PG1 and the second planetary gear set PG2. Therefore, D2 is output through the sixth rotation element N6 that is the output element.

[Third Forward Speed]

The second brake B2 that was operated at the second forward speed $2^{ND}$ is released, and the second clutch C2 is operated at the third forward speed $3^{RD}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the first transfer gear TF1 and is then input to the fifth rotation element N5 as an inverse rotation speed by operation of the first clutch C1. In addition, the rotation speed of the first shaft IS1 is input to the first rotation element N1 and the fourth rotation element N4 by operation of the second clutch C2.

At this time, the rotation speed of the first shaft IS1 is changed according to the gear ratio of the third transfer gear TF3 and is then input to the fourth rotation element N4.

Therefore, the rotation elements of the first planetary gear set PG1 form a third speed line T3 and the rotation elements of the second planetary gear set PG2 form a third shift line SP3 by cooperation of the first planetary gear set PG1 and the second planetary gear set PG2. Therefore, D3 is output through the sixth rotation element N6 that is the output element.

[Fourth Forward Speed]

The second clutch C2 that was operated at the third forward speed $3^{RD}$ is released, and the third clutch C3 is operated at the fourth forward speed $4^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the first transfer gear TF1 and is then input to the fifth rotation element N5 as an inverse rotation speed by operation of the first clutch C1. In addition, the rotation speed of the first shaft IS1 is input to the second rotation element N2 by operation of the third clutch C3.

Therefore, the rotation elements of the first planetary gear set PG1 form a fourth speed line T4 and the rotation elements of the second planetary gear set PG2 form a fourth shift line SP4 by cooperation of the first planetary gear set PG1 and the second planetary gear set PG2. Therefore, D4 is output through the sixth rotation element N6 that is the output element.

[Fifth Forward Speed]

The first clutch C1 that was operated at the fourth forward speed $4^{TH}$ is released, and the second clutch C2 is operated at the fifth forward speed $5^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is input to the second rotation element N2 by operation of the third clutch C3 and is input to the first rotation element N1 and the fourth rotation element N4 by operation of the second clutch C2.

At this time, the rotation speed of the first shaft IS1 is changed according to the gear ratio of the third transfer gear TF3 and is then input to the fourth rotation element N4.

Therefore, the rotation elements of the first planetary gear set PG1 form a fifth speed line T5 and the rotation elements of the second planetary gear set PG2 form a fifth shift line SP5 by cooperation of the first planetary gear set PG1 and the second planetary gear set PG2. Therefore, D5 is output through the sixth rotation element N6 that is the output element.

[Sixth Forward Speed]

The second clutch C2 that was operated at the fifth forward speed $5^{TH}$ is released and the second brake B2 is operated at the sixth forward speed $6^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is input to the second rotation element N2 by operation of the third clutch C3, and the fourth rotation element N4 is operated as the fixed element by operation of the second brake B2.

Therefore, the rotation elements of the first planetary gear set PG1 form a sixth speed line T6 and the rotation elements of the second planetary gear set PG2 form a sixth shift line SP6 by cooperation of the first planetary gear set PG1 and the second planetary gear set PG2. Therefore, D6 is output through the sixth rotation element N6 that is the output element.

[Seventh Forward Speed]

The second brake B2 that was operated at the sixth forward speed $6^{TH}$ is released, and the fourth clutch C4 is operated at the seventh forward speed $7^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is input to the second rotation element N2 by operation of the third clutch C3. In addition, the rotation speed of the first shaft IS1 is changed according to the gear ratio of the fourth transfer gear TF4 and is then input to the fifth rotation element N5 by operation of the fourth clutch C4.

Therefore, the rotation elements of the first planetary gear set PG1 form a seventh speed line T7 and the rotation elements of the second planetary gear set PG2 form a seventh shift line SP7 by cooperation of the first planetary gear set PG1 and the second planetary gear set PG2. Therefore, D7 is output through the sixth rotation element N6 that is the output element.

[Eighth Forward Speed]

The third clutch C3 that was operated at the seventh forward speed $7^{TH}$ is released, and the second brake B2 is operated at the eighth forward speed $8^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the fourth transfer gear TF4 and is then input to the fifth rotation element N5 by operation of the fourth clutch C4. In addition, the fourth rotation element N4 is operated as the fixed element by operation of the second brake B2.

Therefore, the rotation elements of the first planetary gear set PG1 form an eighth speed line T8 and the rotation elements of the second planetary gear set PG2 form an eighth shift line SP8 by cooperation of the first planetary gear set PG1 and the second planetary gear set PG2. Therefore, D8 is output through the sixth rotation element N6 that is the output element.

[Ninth Forward Speed]

The second brake B2 that was operated at the eighth forward speed $8^{TH}$ is released, and the second clutch C2 is operated at the ninth forward speed $9^{TH}$.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is changed according to the gear ratio of the fourth transfer gear TF4 and is then input to the fifth rotation element N5 by operation of the fourth clutch C4. In addition, the rotation speed of the first shaft IS1 is input to the first rotation element N1 and the fourth rotation element N4 by operation of the second clutch C2.

At this time, the rotation speed of the first shaft IS1 is changed according to the gear ratio of the third transfer gear TF3 and is then input to the fourth rotation element N4.

Therefore, the rotation elements of the first planetary gear set PG1 form a ninth speed line T9, and the rotation elements of the second planetary gear set PG2 form a ninth shift line SP9 by cooperation of the first planetary gear set PG1 and the second planetary gear set PG2. Therefore, D9 is output through the sixth rotation element N6 that is the output element.

[Reverse Speed]

As shown in FIG. 2, the second clutch C2 and the first brake B1 are operated at the reverse speed R.

As shown in FIG. 3, the third rotation element N3 is connected to the sixth rotation element N6 through the second transfer gear TF2, and the first rotation element N1 is connected to the fourth rotation element N4 through the third transfer gear TF3.

At this state, the rotation speed of the first shaft IS1 is input to the first rotation element N1 and the fourth rotation element N4 by operation of the second clutch C2, and the second rotation element N2 is operated as the fixed element by operation of the first brake B1.

At this time, the rotation speed of the first shaft IS1 is changed according to the gear ratio of the third transfer gear TF3 and is then input to the fourth rotation element N4.

Therefore, the rotation elements of the first planetary gear set PG1 form a reverse speed line Tr and the rotation elements of the second planetary gear set PG2 form a reverse shift line RS by cooperation of the first planetary gear set PG1 and the second planetary gear set PG2. Therefore, REV is output through the sixth rotation element N6 that is the output element.

As described above, the planetary gear train according to the first exemplary embodiment of the present disclosure can achieve nine forward speeds and one reverse speed by combining two planetary gear sets PG1 and PG2 being the simple planetary gear sets, four transfer gears TF1, TF2, TF3, and TF4 being the externally-meshed gears and six frictional elements C1, C2, C3, C4, B1, and B2.

In addition, optimum gear ratios may be set due to ease of changing gear ratios by using four transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
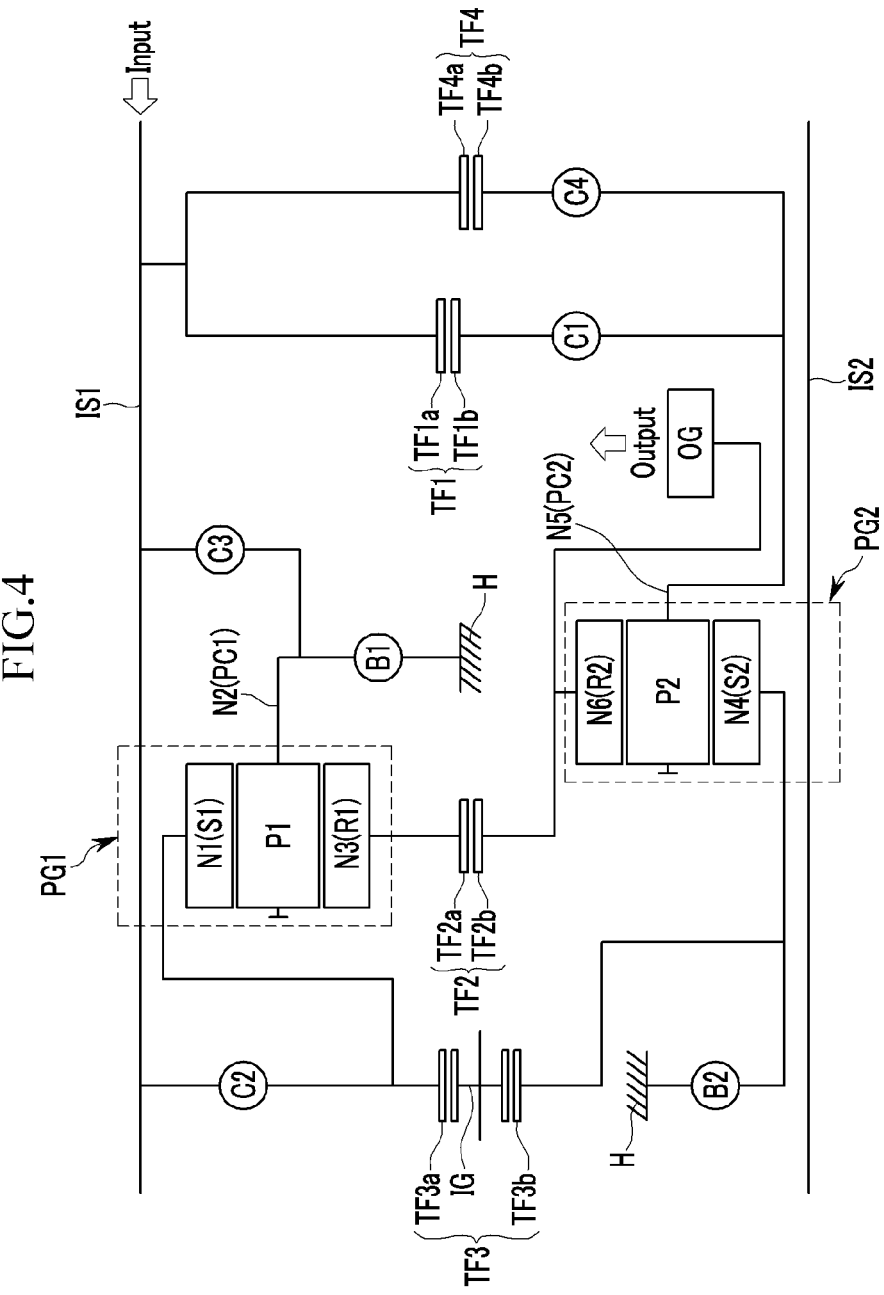
FIG. 4 is a schematic diagram of a planetary gear train according to the second exemplary embodiment of the present disclosure.

FIG. 4 is a schematic diagram of a planetary gear train according to the second exemplary embodiment of the present disclosure.

Referring to FIG. 4, the first clutch C1 is disposed between the first shaft IS1 and the first transfer gear TF1 in the first exemplary embodiment, but the first clutch C1 is disposed between the first transfer gear TF1 and the fifth rotation element N5 in the second exemplary embodiment.

Since functions of the second exemplary embodiment are the same as those of the first exemplary embodiment except the position of the first clutch C1, detailed description thereof will be omitted.

Figure 5:
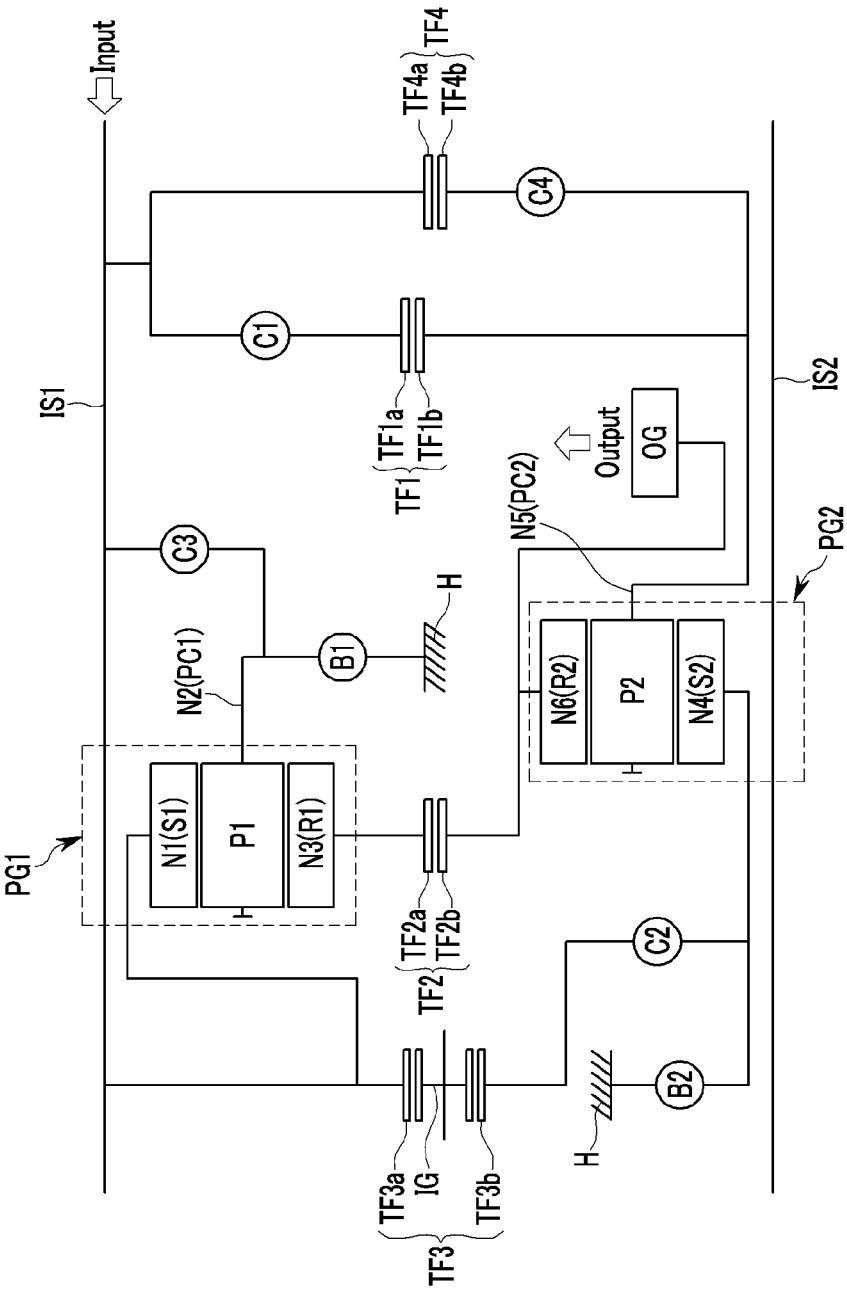
FIG. 5 is a schematic diagram of a planetary gear train according to the third exemplary embodiment of the present disclosure.

FIG. 5 is a schematic diagram of a planetary gear train according to the third exemplary embodiment of the present disclosure.

Referring to FIG. 5, the second clutch C2 is disposed between the first shaft IS1 and the first rotation element N1 in the first exemplary embodiment, but the second clutch C2 is disposed between the third transfer gear TF3 and the fourth rotation element N4 in the third exemplary embodiment.

Since functions of the third exemplary embodiment are the same as those of the first exemplary embodiment except the position of the second clutch C2, detailed description thereof will be omitted.

Figure 6:
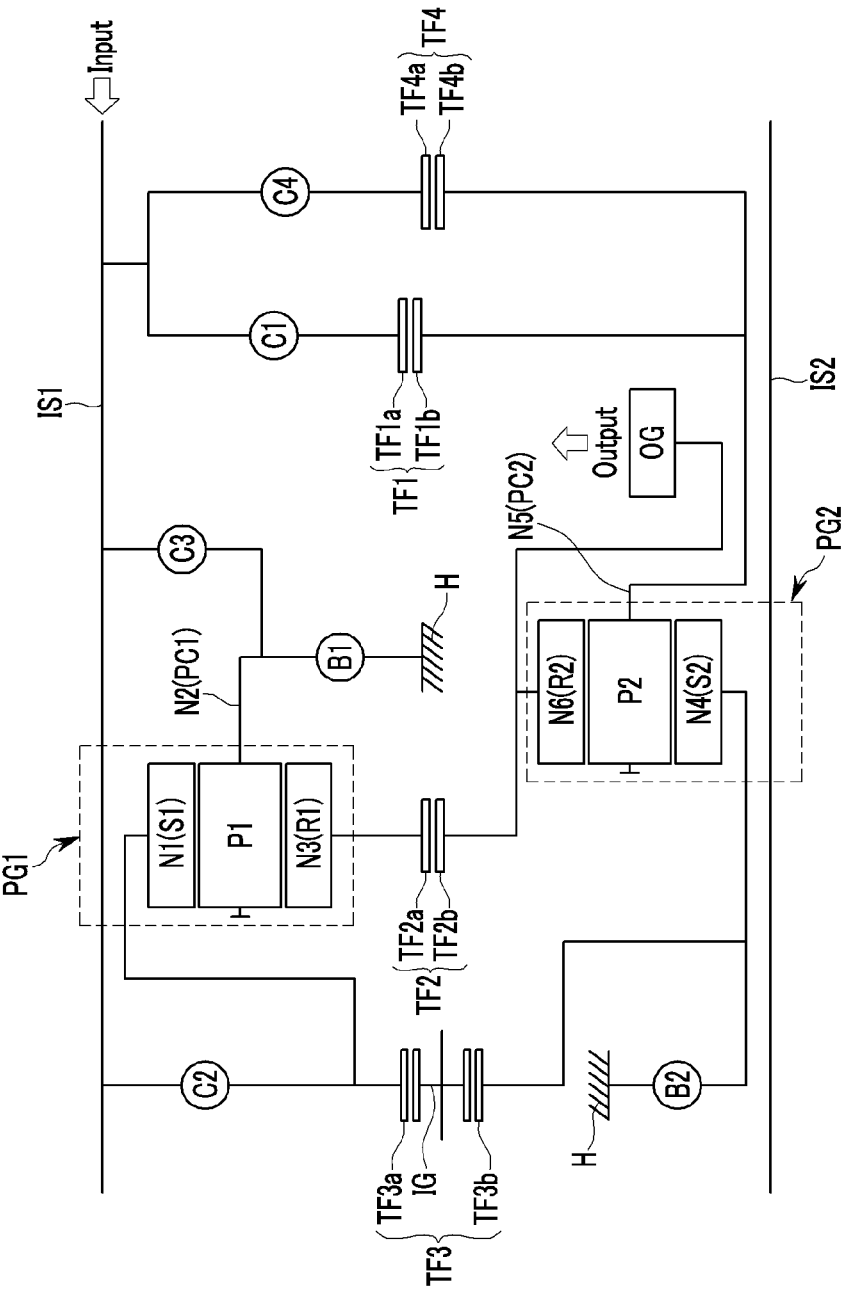
FIG. 6 is a schematic diagram of a planetary gear train according to the fourth exemplary embodiment of the present disclosure.

FIG. 6 is a schematic diagram of a planetary gear train according to the fourth exemplary embodiment of the present disclosure.

Referring to FIG. 6, the fourth clutch C4 is disposed between the fourth transfer gear TF4 and the fifth rotation element N5 in the first exemplary embodiment, but the fourth clutch C4 is disposed between the first shaft IS1 and the fourth transfer gear TF4 in the fourth exemplary embodiment.

Since functions of the fourth exemplary embodiment are the same as those of the first exemplary embodiment except the position of the fourth clutch C4, detailed description thereof will be omitted.

Figure 7:
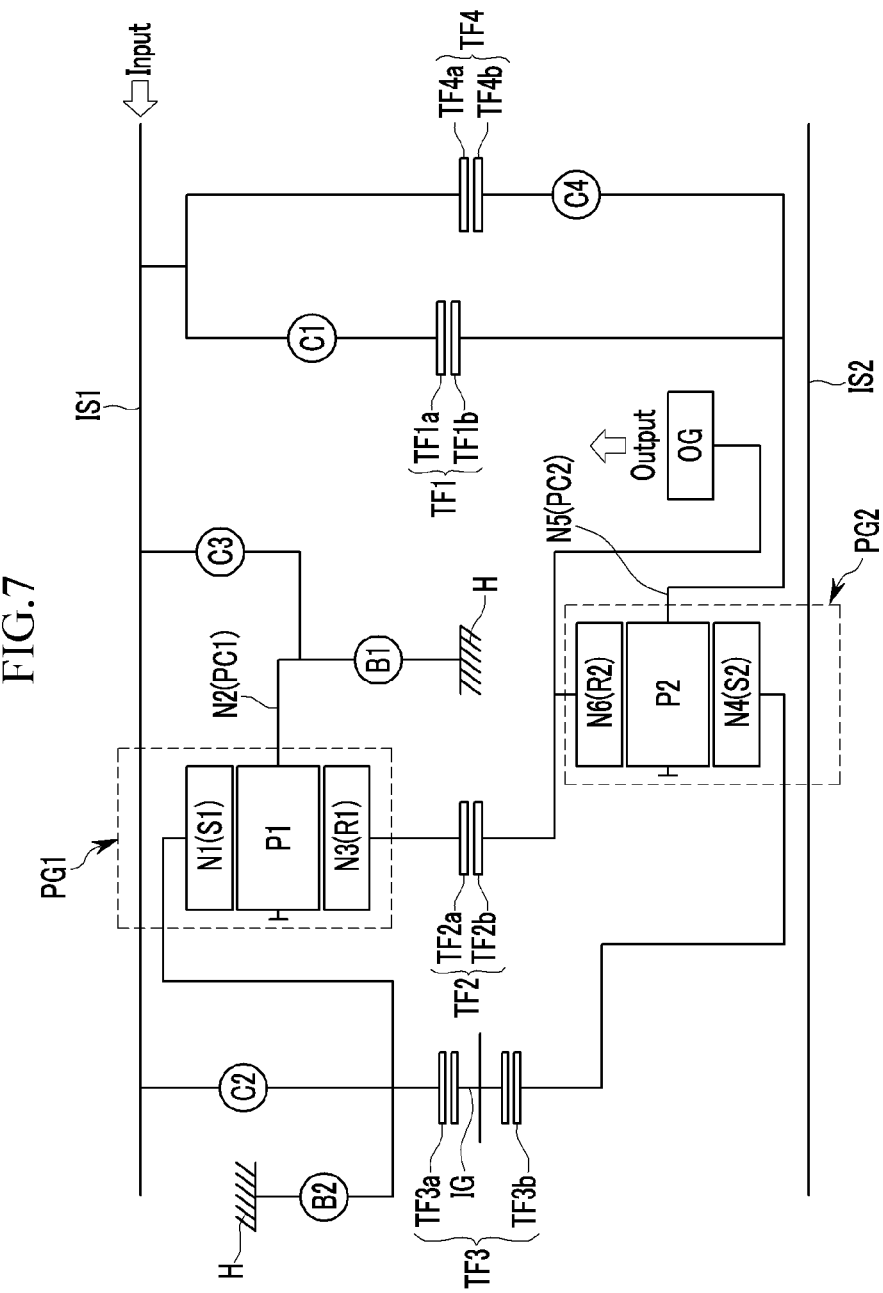
FIG. 7 is a schematic diagram of a planetary gear train according to the fifth exemplary embodiment of the present disclosure.

FIG. 7 is a schematic diagram of a planetary gear train according to the fifth exemplary embodiment of the present disclosure.

Referring to FIG. 7, the second brake B2 is disposed between the fourth rotation element N4 and the transmission housing H in the first exemplary embodiment, but the second brake B2 is disposed between the first rotation element N1 and the transmission housing H in the fifth exemplary embodiment.

Since functions of the fifth exemplary embodiment are the same as those of the first exemplary embodiment except the position of the second brake B2, detailed description thereof will be omitted.

Figure 8:
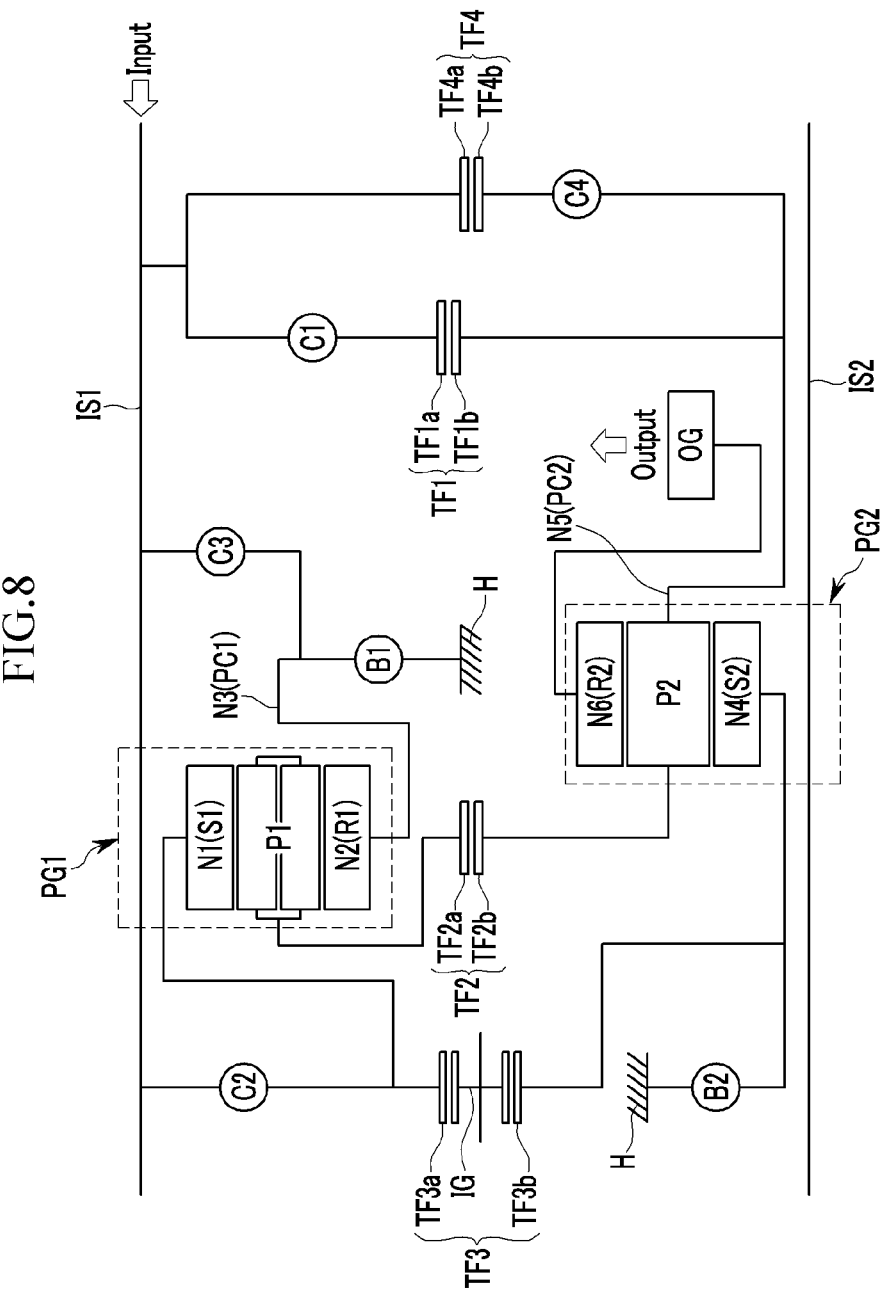
FIG. 8 is a schematic diagram of a planetary gear train according to the sixth exemplary embodiment of the present disclosure.

FIG. 8 is a schematic diagram of a planetary gear train according to the sixth exemplary embodiment of the present disclosure.

Referring to FIG. 8, the first planetary gear set PG1 is the single pinion planetary gear set in the first exemplary embodiment, but the first planetary gear set PG1 is a double pinion planetary gear set in the sixth exemplary embodiment.

Therefore, the second rotation element N2 is changed from the first planet carrier PC1 to the first ring gear R1, and the third rotation element N3 is changed from the first ring gear R1 to the first planet carrier PC1.

Since functions of the sixth exemplary embodiment are the same as those of the first exemplary embodiment except rotation elements consisting of the second and third rotation elements N2 and N3, detailed description thereof will be omitted.

Figure 9:
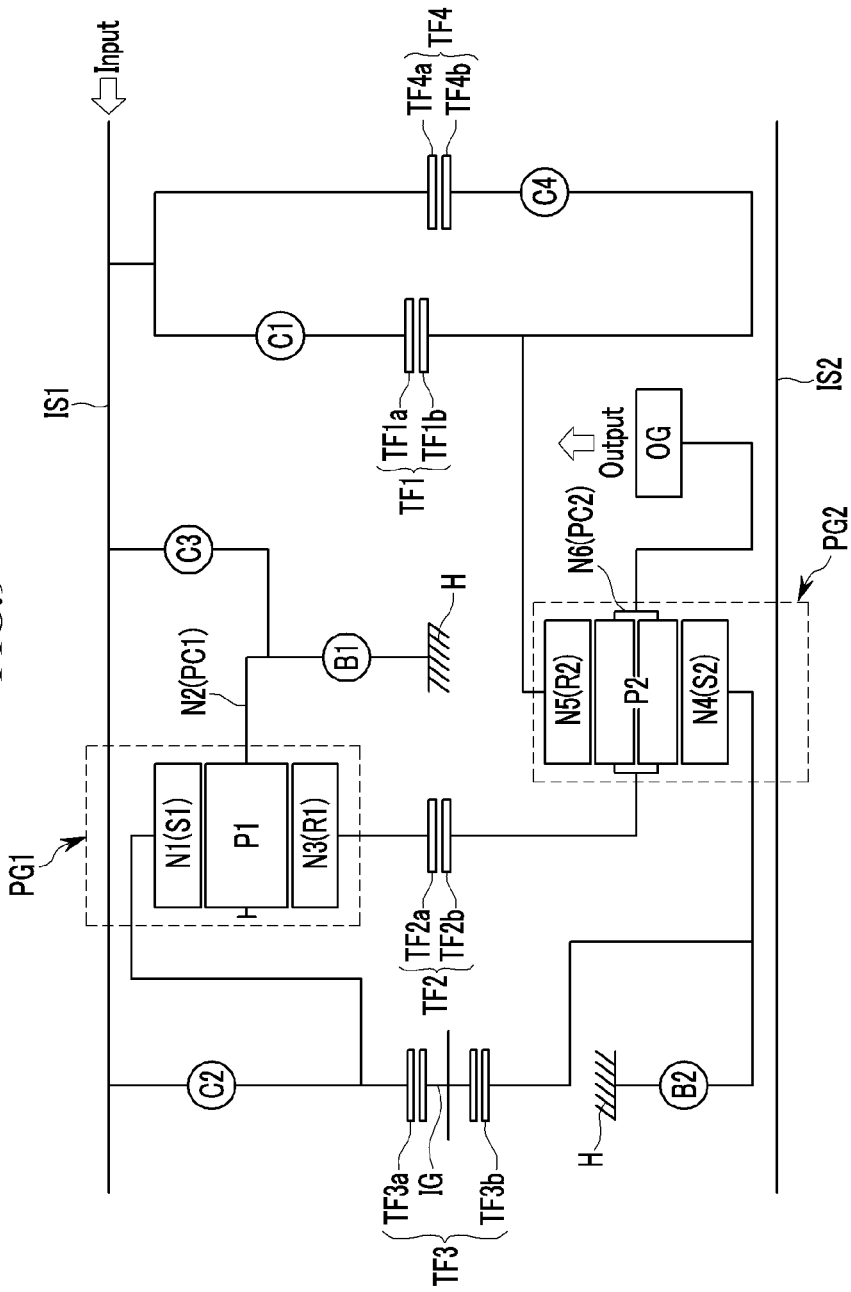
FIG. 9 is a schematic diagram of a planetary gear train according to the seventh exemplary embodiment of the present disclosure.

FIG. 9 is a schematic diagram of a planetary gear train according to the seventh exemplary embodiment of the present disclosure.

Referring to FIG. 9, the second planetary gear set PG2 is the single pinion planetary gear set in the first exemplary embodiment, but the second planetary gear set PG2 is a double pinion planetary gear set in the seventh exemplary embodiment.

Therefore, the fifth rotation element N5 is changed from the second planet carrier PC2 to the second ring gear R2 and the sixth rotation element N6 is changed from the second ring gear R2 to the second planet carrier PC2.

Since functions of the seventh exemplary embodiment are the same as those of the first exemplary embodiment except the rotation elements consisting of the fifth and sixth rotation elements N5 and N6, detailed description thereof will be omitted.

Meanwhile, as illustrated but not limited in the drawings that the second shaft IS2 merely supports the second planetary gear set PG2 without rotational interference therebetween. That is, the second shaft IS2 can be used as a connecting member connecting the fifth rotation element N5 with the first and fourth transfer gears TF1 and TF4.

Nine forward speeds and one reverse speed can be achieved by combining two planetary gear sets being the simple planetary gear sets with four transfer gears and six frictional elements.

In addition, since two planetary gear sets are disposed separately on the first and the second shaft disposed in parallel with a predetermined distance, a length thereof may be reduced and mountability may be improved.

In addition, optimum gear ratios may be set due to ease of changing gear ratios by using four external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

While this inventive concept has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
    a first shaft receiving torque from an engine;
    a second shaft disposed in parallel with the first shaft with a predetermined distance;
    a first planetary gear set disposed on the first shaft, and including a first rotation element selectively connected to the first shaft, a second rotation element selectively connected to the first shaft or a transmission housing, and a third rotation element operated as an output element;
    a second planetary gear set disposed on the second shaft, and including a fourth rotation element connected to the first rotation element through a gear and selectively connected to the transmission housing, a fifth rotation element selectively connected to the first shaft through two paths respectively, and a sixth rotation element connected to the third rotation element and directly connected to an output gear;
    four transfer gears connecting rotation elements of the second planetary gear set with the first shaft and rotation elements of the first planetary gear set; and
    frictional elements including clutches selectively connecting selected rotation elements with each other or with the first shaft and brakes selectively connecting selected rotation elements with the transmission housing,
    wherein the first planetary gear set is a single pinion planetary gear set including a first sun gear being the first rotation element, a first planet carrier being the second rotation element, and a first ring gear being the third rotation element,
    wherein the second planetary gear set is a single pinion planetary gear set including a second sun gear being the fourth rotation element, a second planet carrier being the fifth rotation element, and a second ring gear being the sixth rotation element, and
    wherein the four transfer gears are externally-meshed gears and comprise:
        a first transfer gear connecting directly the first shaft with the fifth rotation element;
        a second transfer gear connecting directly the third rotation element with the sixth rotation element;
        a third transfer gear including an idler gear and connecting directly the first rotation element with the fourth rotation element; and
        a fourth transfer gear connecting directly the first shaft with the fifth rotation element.

2. The planetary gear train of claim 1, wherein the frictional elements comprise:
    a first clutch disposed between the first shaft and the first transfer gear;
    a second clutch disposed between the first shaft and the first rotation element;
    a third clutch disposed between the first shaft and the second rotation element;
    a fourth clutch disposed between the fourth transfer gear and the fifth rotation element;
    a first brake disposed between the second rotation element and the transmission housing; and
    a second brake disposed between the fourth rotation element and the transmission housing.

3. The planetary gear train of claim 2, wherein the first clutch and the first brake are operated at a first forward speed,
    the first clutch and the second brake are operated at a second forward speed,
    the first clutch and the second clutch are operated at a third forward speed,
    the first clutch and the third clutch are operated at a fourth forward speed,
    the second clutch and the third clutch are operated at a fifth forward speed,
    the third clutch and the second brake are operated at a sixth forward speed,
    the third clutch and the fourth clutch are operated at a seventh forward speed,
    the fourth clutch and the second brake are operated at an eighth forward speed,
    the second clutch and the fourth clutch are operated at a ninth forward speed, and
    the second clutch and the first brake are operated at a reverse speed.

4. The planetary gear train of claim 1, wherein the frictional elements comprise:
    a first clutch disposed between the first transfer gear and the fifth rotation element;
    a second clutch disposed between the first shaft and the first rotation element;
    a third clutch disposed between the first shaft and the second rotation element;
    a fourth clutch disposed between the fourth transfer gear and the fifth rotation element;
    a first brake disposed between the second rotation element and the transmission housing; and a second brake disposed between the fourth rotation element and the transmission housing.

5. The planetary gear train of claim 1, wherein the frictional elements comprise:
   a first clutch disposed between the first shaft and the first transfer gear;
   a second clutch disposed between the third transfer gear and the fourth rotation element;
   a third clutch disposed between the first shaft and the second rotation element;
   a fourth clutch disposed between the fourth transfer gear and the fifth rotation element;
   a first brake disposed between the second rotation element and the transmission housing; and
   a second brake disposed between the fourth rotation element and the transmission housing.

6. The planetary gear train of claim 1, wherein the frictional elements comprise:
   a first clutch disposed between the first shaft and the first transfer gear;
   a second clutch disposed between the first shaft and the first rotation element;
   a third clutch disposed between the first shaft and the second rotation element;
   a fourth clutch disposed between the first shaft and the fourth transfer gear;
   a first brake disposed between the second rotation element and the transmission housing; and
   a second brake disposed between the fourth rotation element and the transmission housing.

7. The planetary gear train of claim 1, wherein the frictional elements comprise:
   a first clutch disposed between the first shaft and the first transfer gear;
   a second clutch disposed between the first shaft and the first rotation element;
   a third clutch disposed between the first shaft and the second rotation element;
   a fourth clutch disposed between the fourth transfer gear and the fifth rotation element;
   a first brake disposed between the second rotation element and the transmission housing; and
   a second brake disposed between the first rotation element and the transmission housing.

8. The planetary gear train of claim 1, wherein the first planetary gear set is a double pinion planetary gear set including a first sun gear being the first rotation element, a first ring gear being the second rotation element, and a first planet carrier being the third rotation element, and
   the second planetary gear set is a single pinion planetary gear set including a second sun gear being the fourth rotation element, a second planet carrier being the fifth rotation element, and a second ring gear being the sixth rotation element.

9. The planetary gear train of claim 1, wherein the first planetary gear set is a single pinion planetary gear set including a first sun gear being the first rotation element, a first planet carrier being the second rotation element, and a first ring gear being the third rotation element, and
   the second planetary gear set is a double pinion planetary gear set including a second sun gear being the fourth rotation element, a second ring gear being the fifth rotation element, and a second planet carrier being the sixth rotation element.

10. A planetary gear train of an automatic transmission for a vehicle, comprising:
    a first shaft receiving torque from an engine;
    a second shaft disposed in parallel with the first shaft with a predetermined distance;
    a first planetary gear set disposed on the first shaft, and including a first rotation element selectively connected to the first shaft, a second rotation element selectively connected to the first shaft or a transmission housing, and a third rotation element;
    a second planetary gear set disposed on the second shaft, and including a fourth rotation element connected to the first rotation element and selectively connected to the transmission housing, a fifth rotation element selectively connected to the first shaft through two paths, and a sixth rotation element connected to the third rotation element and directly connected to an output gear;
    a first transfer gear connecting directly the first shaft with the fifth rotation element;
    a second transfer gear connecting directly the third rotation element with the sixth rotation element;
    a third transfer gear including an idler gear and connecting directly the first rotation element with the fourth rotation element;
    a fourth transfer gear connecting directly the first shaft with the fifth rotation element; and
    frictional elements including clutches selectively connecting selected rotation elements with each other or with the first shaft and brakes selectively connecting selected rotation elements with the transmission housing,
    wherein the first planetary gear set is a single pinion planetary gear set including a first sun gear being the first rotation element, a first planet carrier being the second rotation element, and a first ring gear being the third rotation element, and
    the second planetary gear set is a single pinion planetary gear set including a second sun gear being the fourth rotation element, a second planet carrier being the fifth rotation element, and a second ring gear being the sixth rotation element.

11. The planetary gear train of claim 10, wherein the frictional elements comprise:
    a first clutch disposed between the first shaft and the first transfer gear;
    a second clutch disposed between the first shaft and the first rotation element;
    a third clutch disposed between the first shaft and the second rotation element;
    a fourth clutch disposed between the fourth transfer gear and the fifth rotation element;
    a first brake disposed between the second rotation element and the transmission housing; and
    a second brake disposed between the fourth rotation element and the transmission housing.

12. The planetary gear train of claim 10, wherein the frictional elements comprise:
    a first clutch disposed between the first transfer gear and the fifth rotation element;
    a second clutch disposed between the first shaft and the first rotation element;
    a third clutch disposed between the first shaft and the second rotation element;
    a fourth clutch disposed between the fourth transfer gear and the fifth rotation element;
    a first brake disposed between the second rotation element and the transmission housing; and a second brake disposed between the fourth rotation element and the transmission housing.

13. The planetary gear train of claim 10, wherein the frictional elements comprise:
- a first clutch disposed between the first shaft and the first transfer gear;
- a second clutch disposed between the third transfer gear and the fourth rotation element;
- a third clutch disposed between the first shaft and the second rotation element;
- a fourth clutch disposed between the fourth transfer gear and the fifth rotation element;
- a first brake disposed between the second rotation element and the transmission housing; and
- a second brake disposed between the fourth rotation element and the transmission housing.

14. The planetary gear train of claim 10, wherein the frictional elements comprise:
- a first clutch disposed between the first shaft and the first transfer gear;
- a second clutch disposed between the first shaft and the first rotation element;
- a third clutch disposed between the first shaft and the second rotation element;
- a fourth clutch disposed between the first shaft and the fourth transfer gear;
- a first brake disposed between the second rotation element and the transmission housing; and
- a second brake disposed between the fourth rotation element and the transmission housing.

15. The planetary gear train of claim 10, wherein the frictional elements comprise:
- a first clutch disposed between the first shaft and the first transfer gear;
- a second clutch disposed between the first shaft and the first rotation element;
- a third clutch disposed between the first shaft and the second rotation element;
- a fourth clutch disposed between the fourth transfer gear and the fifth rotation element;
- a first brake disposed between the second rotation element and the transmission housing; and
- a second brake disposed between the first rotation element and the transmission housing.

16. The planetary gear train of claim 10, wherein the first planetary gear set is a double pinion planetary gear set including a first sun gear being the first rotation element, a first ring gear being the second rotation element, and a first planet carrier being the third rotation element, and
the second planetary gear set is a single pinion planetary gear set including a second sun gear being the fourth rotation element, a second planet carrier being the fifth rotation element, and a second ring gear being the sixth rotation element.

17. The planetary gear train of claim 10, wherein the first planetary gear set is a single pinion planetary gear set including a first sun gear being the first rotation element, a first planet carrier being the second rotation element, and a first ring gear being the third rotation element, and
the second planetary gear set is a double pinion planetary gear set including a second sun gear being the fourth rotation element, a second ring gear being the fifth rotation element, and a second planet carrier being the sixth rotation element.

18. A planetary gear train of an automatic transmission for a vehicle, comprising:
- a first shaft receiving torque from an engine;
- a second shaft disposed in parallel with the first shaft with a predetermined distance;
- a first planetary gear set disposed on the first shaft, and including a first rotation element selectively connected to the first shaft, a second rotation element selectively connected to the first shaft or a transmission housing, and a third rotation element operated as an output element;
- a second planetary gear set disposed on the second shaft, and including a fourth rotation element connected to the first rotation element through a gear and selectively connected to the transmission housing, a fifth rotation element selectively connected to the first shaft through two paths respectively, and a sixth rotation element connected to the third rotation element and directly connected to an output gear;
- four transfer gears connecting rotation elements of the second planetary gear set with the first shaft and rotation elements of the first planetary gear set; and
- frictional elements including clutches selectively connecting selected rotation elements with each other or with the first shaft and brakes selectively connecting selected rotation elements with the transmission housing, wherein the first planetary gear set is a single pinion planetary gear set including a first sun gear being the first rotation element, a first planet carrier being the second rotation element, and a first ring gear being the third rotation element, wherein the second planetary gear set is a single pinion planetary gear set including a second sun gear being the fourth rotation element, a second planet carrier being the fifth rotation element, and a second ring gear being the sixth rotation element, and wherein the four transfer gears are externally-meshed gears and comprise:
- a first transfer gear connecting the first shaft with the fifth rotation element;
- a second transfer gear connecting the third rotation element with the sixth rotation element;
- a third transfer gear including an idler gear and connecting the first rotation element with the fourth rotation element; and
- a fourth transfer gear connecting the first shaft with the fifth rotation element, wherein the frictional elements comprise:
a first clutch disposed between the first shaft and the first transfer gear;
a second clutch disposed between the first shaft and the first rotation element;
a third clutch disposed between the first shaft and the second rotation element;
a fourth clutch disposed between the fourth transfer gear and the fifth rotation element;
a first brake disposed between the second rotation element and the transmission housing; and
a second brake disposed between the fourth rotation element and the transmission housing.

* * * * *